United States Patent [19]

Lin

[11] Patent Number: 4,919,357

[45] Date of Patent: Apr. 24, 1990

[54] SHIP-SHAPED VIDEO-TAPE REWINDER

[76] Inventor: Long-Jing Lin, No. 53 Yih Yeong Rd., 80257 Lin Ya Dist., Kaohsiung, Taiwan

[21] Appl. No.: 283,456

[22] Filed: Dec. 12, 1988

[51] Int. Cl.⁵ .................. G11B 15/32; G02B 6/04
[52] U.S. Cl. .................... 242/199; 242/197; 242/200; 360/96.3; 360/96.5; 446/160; 446/397; D14/121
[58] Field of Search .............. 242/198, 199, 200, 201; 360/132, 96.1, 96.3, 96.5, 96.6; 446/160, 302, 397; D14/120-123

[56] References Cited

U.S. PATENT DOCUMENTS 4,159,810 7/1979 Hodkinson ................ 360/132 X
4,787,874 11/1988 Hardy et al. ................ 446/160

*Primary Examiner*—John Petrakes
*Attorney, Agent, or Firm*—Kirschstein, Ottinger, Israel & Schiffmiller

[57] ABSTRACT

A ship-shaped video-tape rewinder having an outward shape like a steamer, a sailboat, a ferry-boat, etc. The mechanical components for rewinding are arranged on the floorboards and a tape case is provided in the deck, the case being raised up or down for placing in or taking out a video tape by pressing a push button set on the front deck.

5 Claims, 3 Drawing Sheets

SHIP-SHAPED VIDEO-TAPE REWINDER

BACKGROUND OF THE INVENTION

As the standard of living rises, recreational programs on video tapes have been growing more and more popular. Therefore, video-tape rewinders are widely needed in proportion to the number of video cassette recorders in use. However, the rewinders are mostly made to have a square or rectangular shape without any attractive design for decoration. They are only different in arranging the internal mechanical components.

It would be desirable to supply a video-tape rewinder having both a practical function and a decorative value as well.

SUMMARY OF THE INVENTION

This ship-shaped video-tape rewinder is formed as a steamer, a sailboat, a ferryboat, etc. to have an elegant and beautiful appearance for decoration in addition to the function of rewinding a video tape.

The mechanical components to rewind a video tape are mounted on the floorboards and not to be described here, as they are all the same as described in U.S. Pat. No. 4,848,699.

The tape case for placing in a video tape for rewinding is provided in the deck and the upper section of the tape case is formed as a wheelhouse. Besides, the tape case is adapted to be raised up and down at its front for placing in or taking out a video tape. A push button is provided at the front deck to release a case-moving arm to allow the tape case to be raised up, and an indicating lamp is set in the wheelhouse to show that the rewinder is operating or not. In addition, a music integrated circuit is hidden in the middle hold to play music when the action of rewinding is finished.

DETAILED DESCRIPTION OF THE INVENTION

Figure 1:
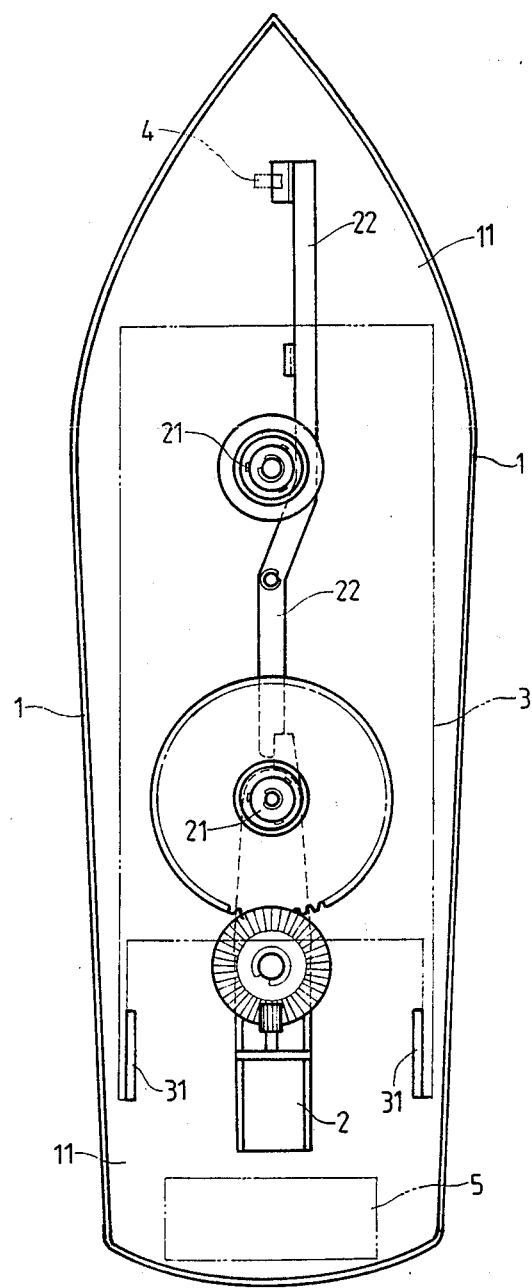
FIG. 1 is a top plan view of the mechanical components of the ship-shaped video-tape rewinder in accordance with the present invention.

At first, FIG. 1 shows the arrangement of the mechanical components for rewinding a video tape in this ship-shaped video-tape rewinder, and they will not be described here, as the same applicant has another application Ser. No. 158,557 and entitled "A car-shaped video-tape rewinder" which was filed on Feb. 22, 1988, now U.S. Pat. No. 4,848,699 and has the same rewinding structure. Hence, only the outward shape of the rewinder is going to be described herein with reference with the drawings.

The mechanical components such as a motor 2, winding head 21, a case-opening arm 22, positioning seats 31 for combining a tape case 3 with a hull 1, etc. are properly installed in the empty space of the middle hold on the floorboards 11.

Figure 2:
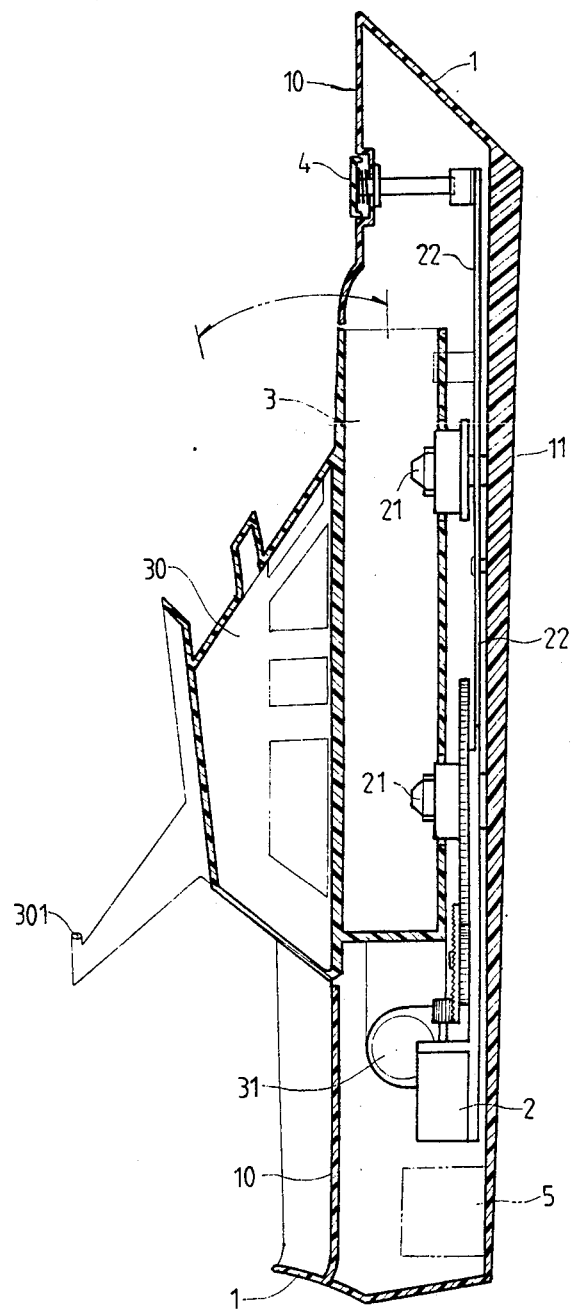
FIG. 2 is a side cross-sectional view of the ship-shaped video-tape rewinder in accordance with the present invention.

Referring to FIGS. 1 and 2, the tape case 3 is located in the deck 10 of the hull 1, having its front end adapted to be raised up and down for placing in or taking out a tape. The upper section of the tape case 3 is formed as a wheelhouse 30 so as to give the tape case 3 an elegant and beautiful outward appearance no matter if this rewinder is in use or not. A push button 4 is provided at the front section deck to raise up the front of the tape case 3 half hidden in the deck for placing in or taking out a tape.

The push button 4 is activated to raise the tape case 3 and is mounted on the front deck 10. The button has a post extending through the front deck 10 down to rest on one end of the case-opening arm 22. When the push button 4 is pressed down, it moves the case-opening arm 22 to release the tape case 3 to be raised up. An indicating lamp 301 is provided at a proper position in the wheelhouse 30 and a music integrated circuit chip 5 is provided down the deck to broadcast a music when the action of rewinding is finished.

Figure 3:
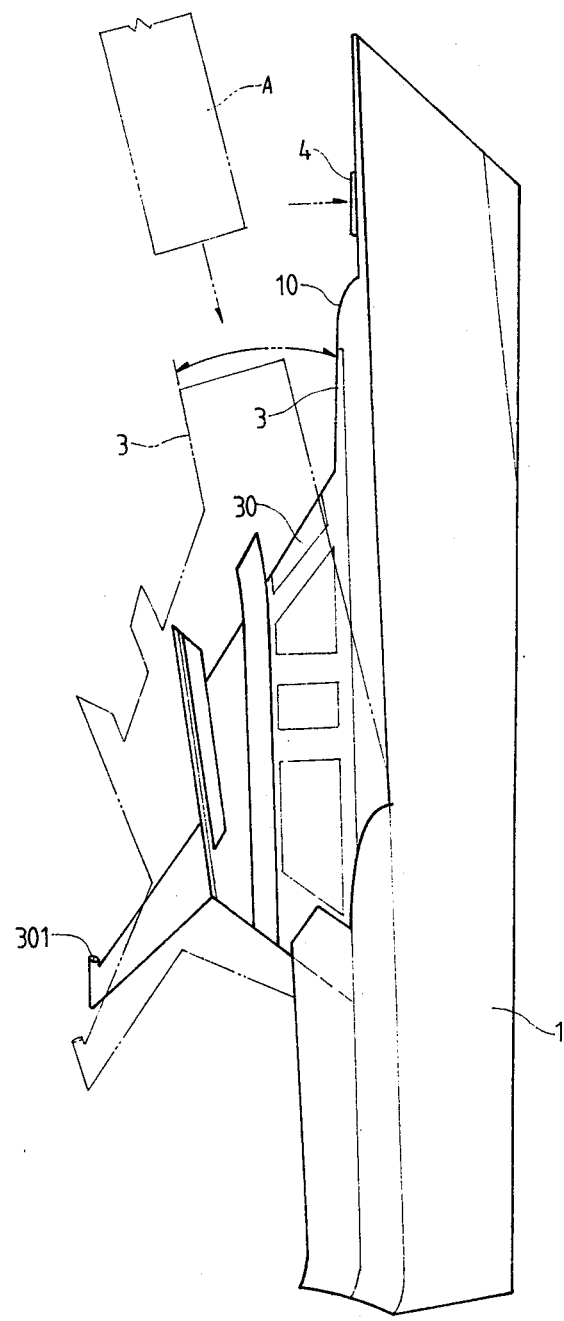
FIG. 3 is a side view of the tape case in the ship-shaped video-tape rewinder in accordance with the present invention with insertion of a video tape being shown in phantom lines.

FIG. 3 shows how to handle this tape rewinder. The tape case 3 is usually pushed down to stay in the middle hold, but is raised up for placing in or taking out a video tape A and should be pushed down to the usual position for rewinding.

This new style of a video tape rewinder is considered to be a breakthrough to conventional rewinders, being equipped with an excellent quality of merchandise and a decorative gain to increase its industrial worthiness.

I claim:

1. A tape cassette rewinder, comprising:

(a) a boat-shaped housing having a base, a deck above the base, a prow at the front of the housing, a stern at the rear of the housing, and a lid-like boat member pivotably mounted on the housing between the prow and the stern for movement between a lid-open position and a lid-closed position, said boat member having an upper compartment generally resembling a wheelhouse and situated above the deck in the lid-closed position, and a lower compartment in which a tape cassette is insertable in the lid-open position and in which the tape cassette is contained within the housing between the base and the deck in the lid-closed position;

(b) rewinding means mounted within the housing, and operative for rewinding the tape cassette in the lid-closed position, and for automatically terminating the rewinding when the rewinding is completed, said rewinding means including a rotary, main winding head engageable with the tape cassette in the lid-closed position, an electrically-powered motor having a drive shaft, and a gear transmission between the drive shaft and the head for rotating the same;

(c) lid-opener means for automatically opening the boat member when the rewinding is completed, including a movable swing arm pivotably mounted on the base, and having one end operatively connected to the rewinding means and movable by the rewinding means to a release position, said swing arm also having an opposite end at the prow; and (d) means for manually opening the boat member to enable insertion of a tape cassette prior to rewinding, including a manually operable push button on the deck at the prow and operatively connected to the opposite end of the swing arm to pivot the swing arm to the release position.

2. The rewinder according to claim 1, wherein the lower compartment has at least one opening through which the head passes in the lid-closed position.

3. The rewinder according to claim 1, wherein the upper and lower compartments share a common wall which is coplanar with the deck in the lid-closed position.

4. The rewinder according to claim 1; and further comprising a light which is illuminated during rewinding, said light being mounted on the wheelhouse.

5. The rewinder according to claim 1; and further comprising a sound emitter for emitting sound when the rewinding is completed, said sound emitter being mounted within the boat-shaped housing.

* * * * *